(12) United States Patent
     Roberts

(10) Patent No.: US 9,891,318 B2
(45) Date of Patent: Feb. 13, 2018

(54) LOCATION DETECTION SYSTEM

(75) Inventor: Richard D. Roberts, Hillsboro, OR (US)

(73) Assignee: INTEL CORPORATION, Santa Clara, CA (US)

(*) Notice: Subject to any disclaimer, the term of this patent is extended or adjusted under 35 U.S.C. 154(b) by 806 days.

(21) Appl. No.: 13/976,989

(22) PCT Filed: Nov. 30, 2011

(86) PCT No.: PCT/US2011/062578
§ 371 (c)(1),
(2), (4) Date: Jun. 27, 2013

(87) PCT Pub. No.: WO2013/081595
PCT Pub. Date: Jun. 6, 2013

(65) Prior Publication Data
US 2013/0271747 A1    Oct. 17, 2013

(51) Int. Cl.
| | |
|---|---|
| *G01C 3/08* | (2006.01) |
| *G01S 17/06* | (2006.01) |
| *G01S 17/00* | (2006.01) |
| *G01S 17/42* | (2006.01) |
| G01S 3/784 | (2006.01) |

(52) U.S. Cl.
CPC ............ *G01S 17/06* (2013.01); *G01S 17/003* (2013.01); *G01S 17/42* (2013.01); *G01S 3/784* (2013.01)

(58) Field of Classification Search
CPC ........ G01S 17/06; G01S 17/003; G01S 17/42; G01S 3/784
See application file for complete search history.

(56) References Cited

U.S. PATENT DOCUMENTS

| | | | |
|---|---|---|---|
| 6,128,576 A | 10/2000 | Nishimoto | |
| 2009/0072996 A1 | 3/2009 | Schoepp | |
| 2010/0271617 A1* | 10/2010 | Damink | G01S 11/12 356/5.09 |
| 2011/0169684 A1* | 7/2011 | Margolin | G01S 5/12 342/30 |

FOREIGN PATENT DOCUMENTS

JP       05-034436 A      2/1993

OTHER PUBLICATIONS

International Search Report and Written Opinion, dated Jul. 11, 2012, Application No. PCT/US2011/062578, Filed Date: Nov. 30, 2011, pp. 10.

* cited by examiner

*Primary Examiner* — Samantha K Abraham

(57) ABSTRACT

Various embodiments are directed to a location detection system. The location detection system may utilize one or more light sources in a fixed and known position capable of emitting modulated light. The location detection system may utilize one or more light receivers in a fixed and known position operative to detect light emitted by the light sources that has been reflected back off an object. The location detection system may utilize a processor circuit that may be communicatively coupled with the light receiver and the light sources. The processor circuit may be operative to receive signals indicative of the detected reflected emitted light from the light receiver. The processor circuit may also be operative to process the signals to determine a location of the object that reflected the emitted light.

20 Claims, 10 Drawing Sheets

100-A

100-B

200

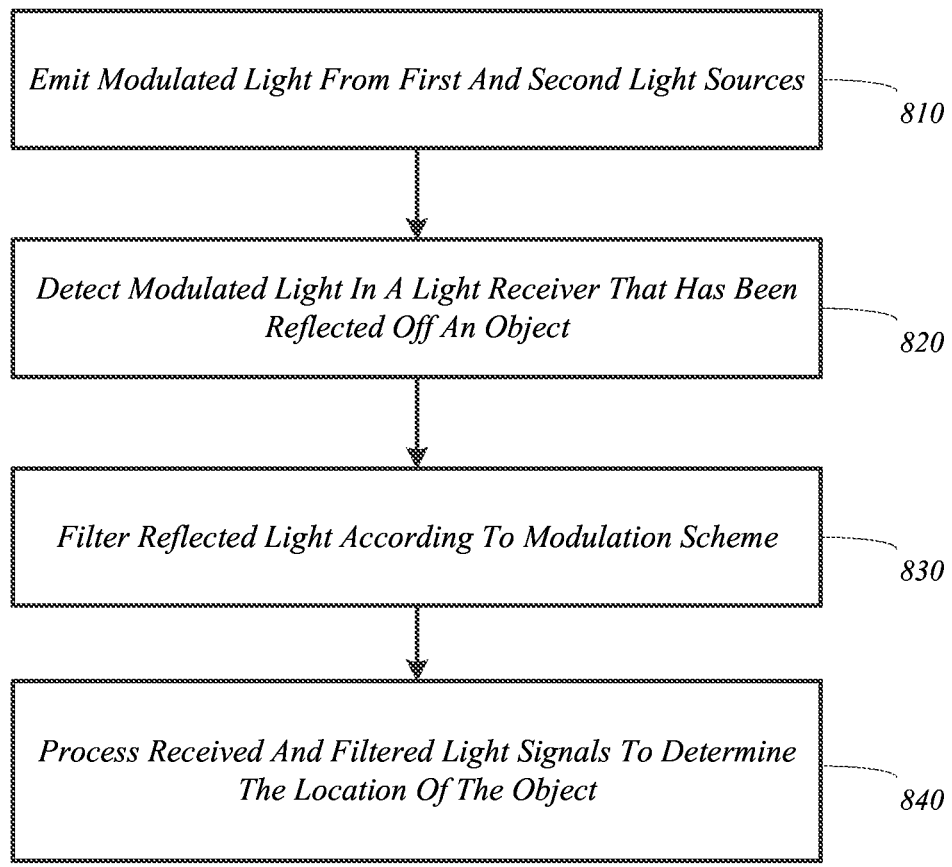

840

1000

LOCATION DETECTION SYSTEM

BACKGROUND

Many automobiles today include object detection as a feature when operating the automobile in potentially crowded areas like parking lots or driveways. The most common technique implements sound navigation and ranging (sonar). Sonar is relatively inexpensive but suffers from poor resolution. Another technique is radio detection and ranging (radar). Radar provides acceptable resolution but can be relatively expensive to implement. Yet another technique is light detection and ranging (lidar). Lidar provides excellent resolution but at significant cost. Accordingly, there may be a need for improved techniques to solve these and other problems.

BRIEF DESCRIPTION OF THE DRAWINGS

FIG. 8 illustrates one embodiment of a logic flow.

DETAILED DESCRIPTION

Figure 1A:
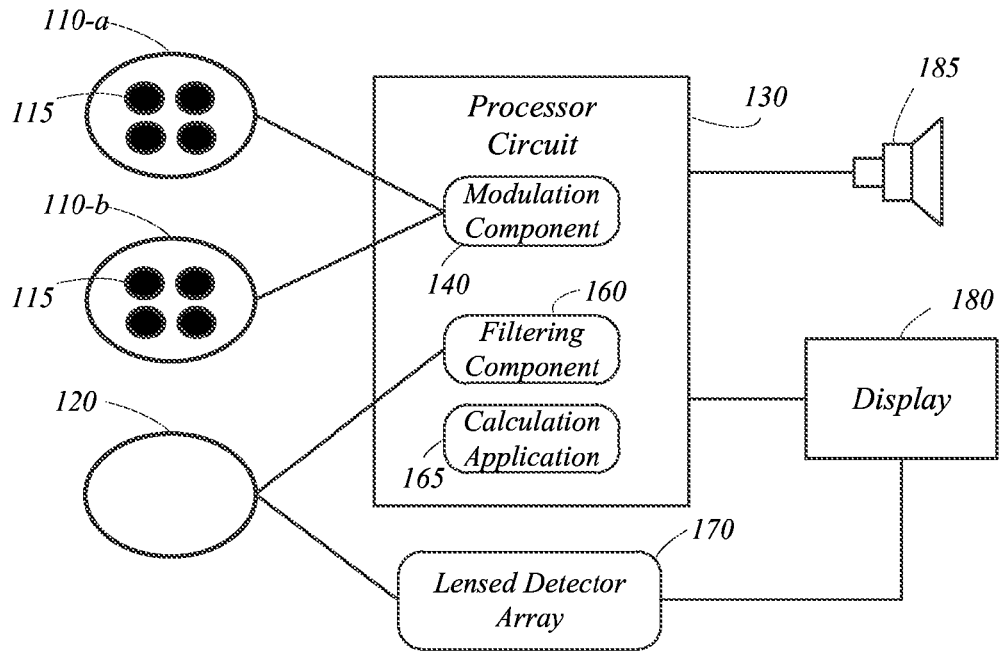
FIG. 1A illustrates one embodiment of a location detection system.

In various embodiments, a location detection system may address common deficiencies associated with current location detection systems.

The location detection system may utilize, in some embodiments, multiple light sources capable of emitting modulated light. The light sources may utilize multiple light emitting diodes (LEDs). The light sources may be in a fixed and known position. The location detection system may utilize, in some embodiments, a light receiver. The light receiver may be operative to detect light emitted by the light sources that has been reflected back off an object. The light receiver may also be in a fixed and known position. The location detection system may utilize, in some embodiments, a processor circuit. The processor circuit may be communicatively coupled with the light receiver and the light sources. The processor circuit may be operative to receive signals indicative of the detected reflected emitted light from the light receiver. The processor circuit may also be operative to process the signals to determine a location of the object that reflected the emitted light.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1A illustrates one embodiment 100-A of a location detection system and its components. A first light source 110-a is shown and may be communicatively coupled with a modulation component 140 under control of a processor circuit 130. Similarly, a second light source 110-b is shown and may be communicatively coupled with the modulation component 140 under control of the processor circuit 130. The modulation component 140 may be operative to modulate the light emitted from the first and second light sources 110-a, 110-b to a specific pattern. The modulation may be accomplished by turning the first and second light sources 110-a, 110-b on and off thousands of times per second. This is termed on-off keying (OOK) and may be referred to as a ranging tone. The modulation component 140 may create a first ranging tone for the first light source 110-a and a second ranging tome for the second light source 110-b. The first and second light sources may be comprised of multiple light emitting diodes (LEDs) 115. The embodiments are not limited in this context.

FIG. 1A also illustrates a light receiver 120 communicatively coupled with the processor circuit 130 and a lensed detector array 170. The processor circuit 130 may include a filtering component 160 that may be operative to filter signals indicative of light that has been reflected off an object. The filtering may be performed to ignore received light signals that do not match the emitted light that has been modulated according to either the first or second ranging tone. By emitting the light in a known pattern, reflected light that is detected can be filtered to remove environmental interference that may produce noise in the reflected light. Thus, only specific light emitted by the light sources 110-a, 110-b may be detected and acted upon by processor circuit 130. The embodiments are not limited in this context.

The lensed detector array may be operative to map an azimuth angle of arrival for detected emitted light that has been reflected off an object and that matches the first or second OOK ranging tones to pixel locations on an image plane. A display 180 communicatively coupled with the lensed detector array 170 may be operative to display the mapped pixel locations to create an image of the object reflecting the emitted light.

The processor circuit 130 may be operative to determine the location of the object with respect to the known location of the first and second light sources 110-a, 110-b and the known location of the light receiver 120. The location of the object may be calculated based on factors inherent in the geometry of the physical arrangement of the known location of the first and second light sources 110-a, 110-b and known location of the light receiver 120. Specifically, the object location may be calculated by a calculation application 165 under control of the processor circuit 130 using known principles of elliptical geometry. These calculations are described in more detail below. The embodiments are not limited in this context.

The processor circuit 130 may be communicatively coupled with other applications and components such as the display 180 and a speaker 185. Based on the location of the object a visual alert may be displayed on display 180 to alert a human operator as to the existence and location of the object. Moreover, the distance of the object determined by the calculation application 165 may be displayed on the display along with a rendering of the object. Similarly, an audible alert may be emitted from speaker 185 to alert a human operator as to the existence of the object. The audible alert may change in pitch, frequency and/or tone as the distance to the object gets closer. The embodiments are not limited in this context.

Figure 1B:
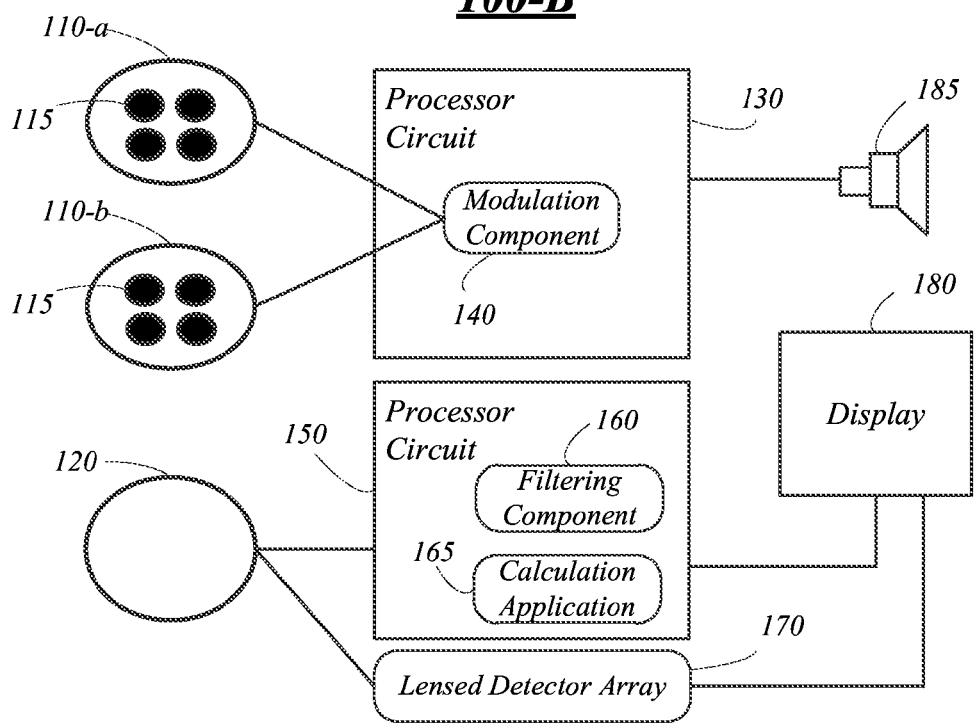
FIG. 1B illustrates another embodiment of a location detection system.

FIG. 1B illustrates another embodiment 100-B of a location detection system. In this embodiment, the processor circuit 130 may be communicatively coupled with the first and second light sources 110-a, 110-b but not the light receiver 120, the display 180, or the speaker 185. A second processor circuit 150 may be communicatively coupled with the light receiver 120, the display 180, or the speaker 185. In this arrangement, the tasks and functions described with respect to the embodiment 100-A of FIG. 1A may be split between the two processor circuits 130, 150. Processor circuit 130 may be responsible for the modulation functions associated with the first and second light sources 110-a, 110-b (e.g., the transmission side). Processor circuit 150 may be responsible for the receiving and processing tasks and functions associated with the light receiver 120 (e.g., the reception side). The embodiments are not limited in this context.

It should be noted that the description above and corresponding figures disclose two light sources and a single light receiver which creates two light source/light receiver pairings. Adding a second light receiver would create two additional light source/light receiver pairings.

Figure 2:
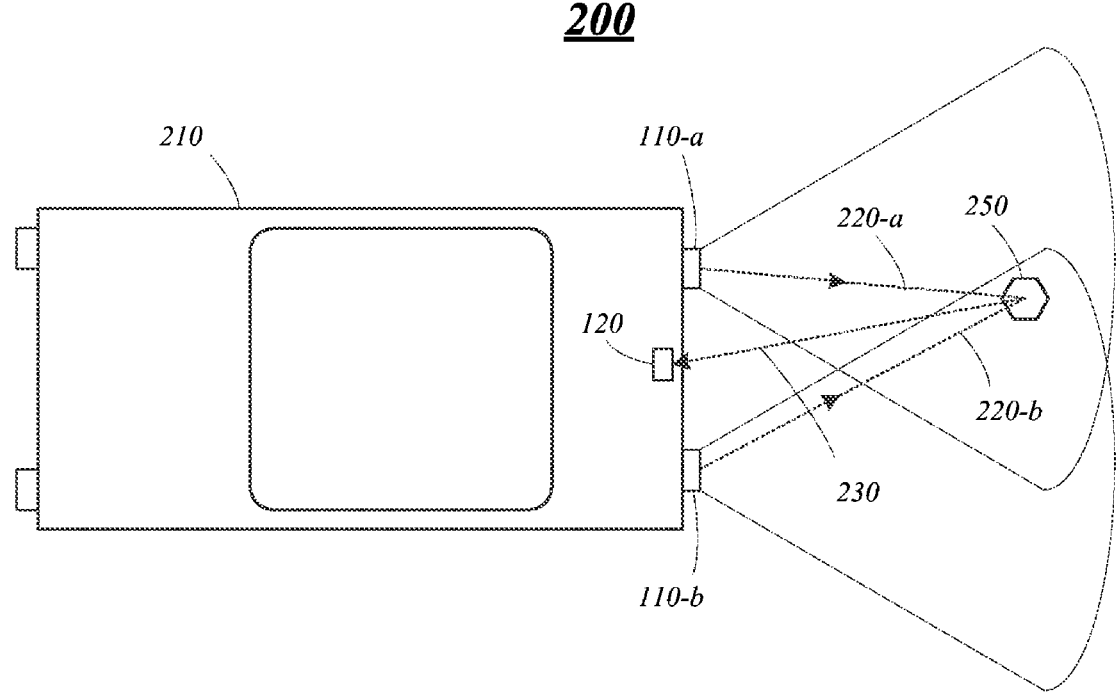
FIG. 2 illustrates one embodiment of location detection system integrated into an automobile.

FIG. 2 illustrates one embodiment 200 of location detection system integrated into an automobile 210. The first light source 110-a may be integrated into a first taillight of the automobile 210. Similarly, the second light source 110-a may be integrated into a second taillight of the automobile 210. The light receiver 120 may be mounted in a fixed and known location somewhere near the rear of the automobile 210. An object 250 is shown that may be located behind the automobile 210. The first light source 110-a may emit modulated light 220-a according to the first ranging tone. The emitted modulated light 220-a may bounce off the object 250 and may be reflected 230 back to the light receiver 120 where it may be received and processed. Similarly, the second light source 110-a may emit modulated light 220-b according to the second ranging tone. The emitted modulated light 220-b may bounce off the object 250 and may be reflected 230 back to the light receiver 120 where it may be received and processed. The embodiments are not limited in this context.

Figure 3:
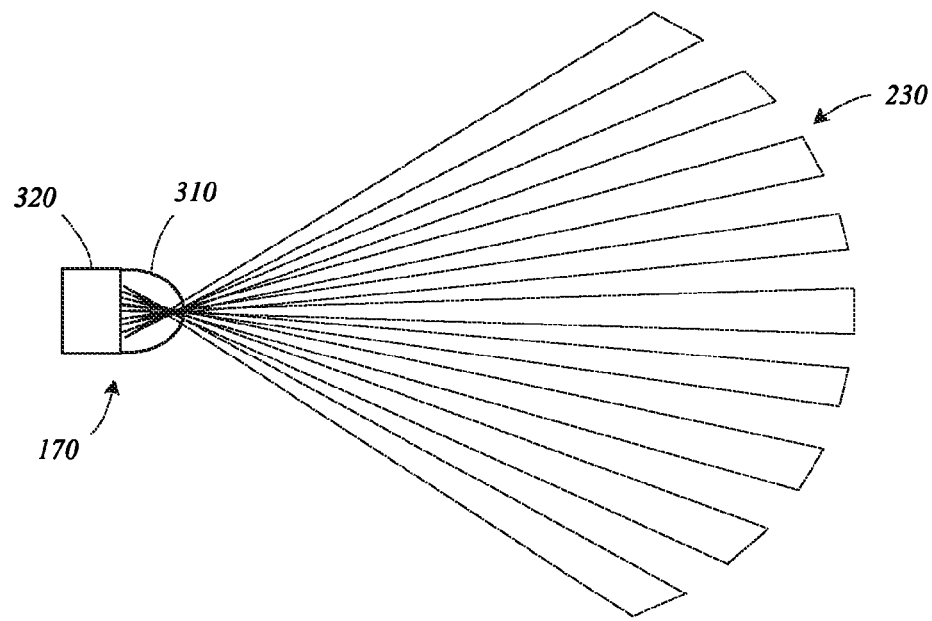
FIG. 3 illustrates an example of light entering a lens.

FIG. 3 illustrates an example of light entering a lensed detector array 170. The lensed detector array 170 may be comprised of a lens 310 and a linear detector array 320. Light reflected 230 off the object 250 may enter lens 310. The lensed detector array 170 may be operative to map an azimuth angle of arrival for detected emitted light that has been reflected off an object and that matches the first or second OOK ranging tones to pixel locations on an image plane of the linear detector array 320. A display 180 may be communicatively coupled with the lensed detector array 170 and may be operative to display the mapped pixel locations to create an image of the object 250 reflecting the emitted light. The embodiments are not limited in this context.

Figure 4:
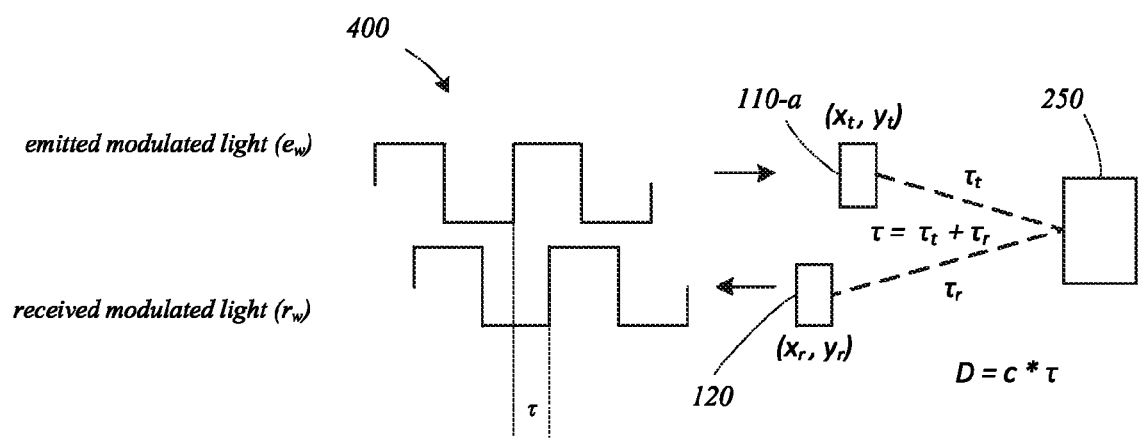
FIG. 4 illustrates one example of a waveform being reflected off an object according to an embodiment of the invention.

FIG. 4 illustrates one example of a waveform 400 being reflected off an object 250 according to an embodiment of the invention. The waveform 400 represents an OOK ranging tone. The waveform 400 may be high when on and low when off. The first light source 110-a located at a known and fixed position $(x_t, y_t)$ may emit the modulated waveform 400 which may strike the object 250 and be reflected to the light receiver 120 at a known and fixed position $(x_r, y_r)$. It may take a certain time $\tau_t$ for the emitted light to reach the object and another time $\tau_r$ to reach the light receiver 120. The total time delay from light source 110-a to light receiver 120 can be represented by $\tau = \tau_t + \tau_r$. This time delay, $\tau$, is graphically shown as the phase difference of the emitted waveform ($e_w$) as compared to the received waveform ($r_w$). In addition, the distance from the light source 110-a to the object 250 to the light receiver 120 can be calculated as:

$$D = c^* \tau$$

in which c is the speed of light. While not shown, the same analysis would apply to light emitted from the second light source 110-b. The embodiments are not limited in this context.

Figure 5:
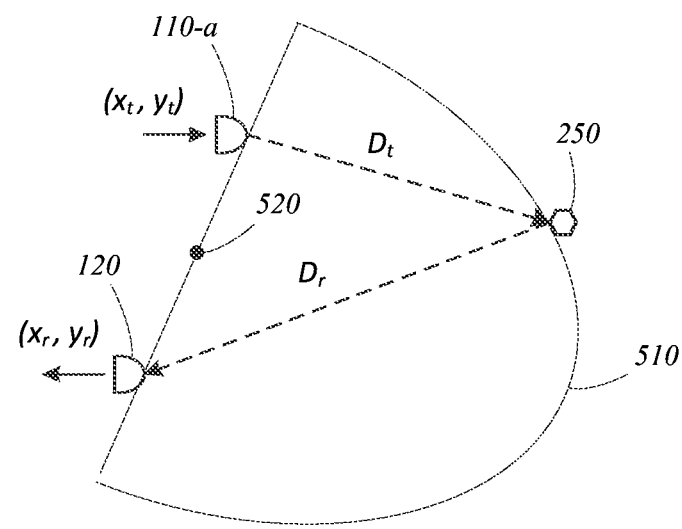
FIG. 5 illustrates one example of the geometry pertaining to light reflected off an object according to an embodiment of the invention.

FIG. 5 illustrates one example of the geometry pertaining to emitted light reflected off an object 250 according to an embodiment of the invention. Light emitted from the first light source 110-a located at a known and fixed position $(x_t, y_t)$ may travel a distance $D_t$ before reaching object 250. This light may be reflected and received by light receiver 120 at a known and fixed position $(x_r, y_r)$ after travelling a second distance $D_r$. The total distance travelled is $D = D_t + D_r$. For a given light source 110-a and light receiver 120 pair, knowing the total time delay from first light source 110-a to light receiver 120 means that the object 250 that reflected the light lies on an ellipse 510 in which the foci are the first light source 110-a and the light receiver 120. The origin, o, of the ellipse 510 is the midpoint between a line that connects the first light source 110-a and the light receiver 120. The embodiments are not limited in this context.

Figure 6:
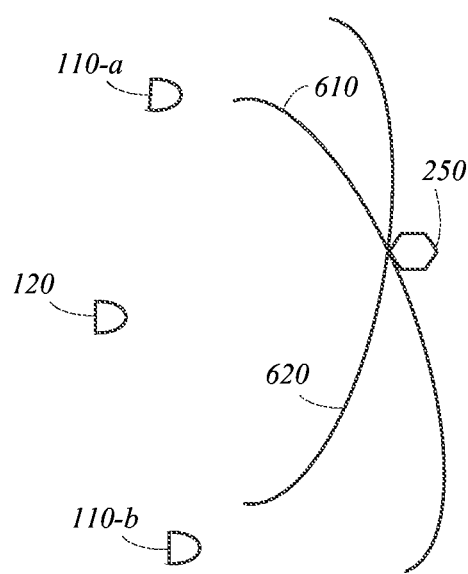
FIG. 6 illustrates another example of the geometry pertaining to light reflected off an object according to an embodiment of the invention.

FIG. 6 illustrates another example of the geometry pertaining to light reflected off an object 250 according to an embodiment of the invention. In this example, there are two light sources 110-a, 110-b and a light receiver 120. Thus, there are two light source and light receiver pairs meaning that two ellipses 610, 620 may result. Ellipse 610 may be the result of light emitted from the first light source 110-a that is reflected off the object 250 and received by the light receiver 120. Ellipse 620 may be the result of light emitted from the second light source 110-b that is reflected off the object 250 and received by the light receiver 120. As is shown in FIG. 6 and which can be derived mathematically, the intersecting point of the two ellipses 610, 620 is at the location of the object 250 that reflected the emitted light. Because the first and second light sources 110-a, 110-b and the light receiver 120 are in fixed and known locations that happen to be the foci of the ellipses 610, 620, the location of the object 250 can be solved for using the equation for an ellipse and the time delay for each light source and light receiver pairs. The embodiments are not limited in this context.

Figure 7A:
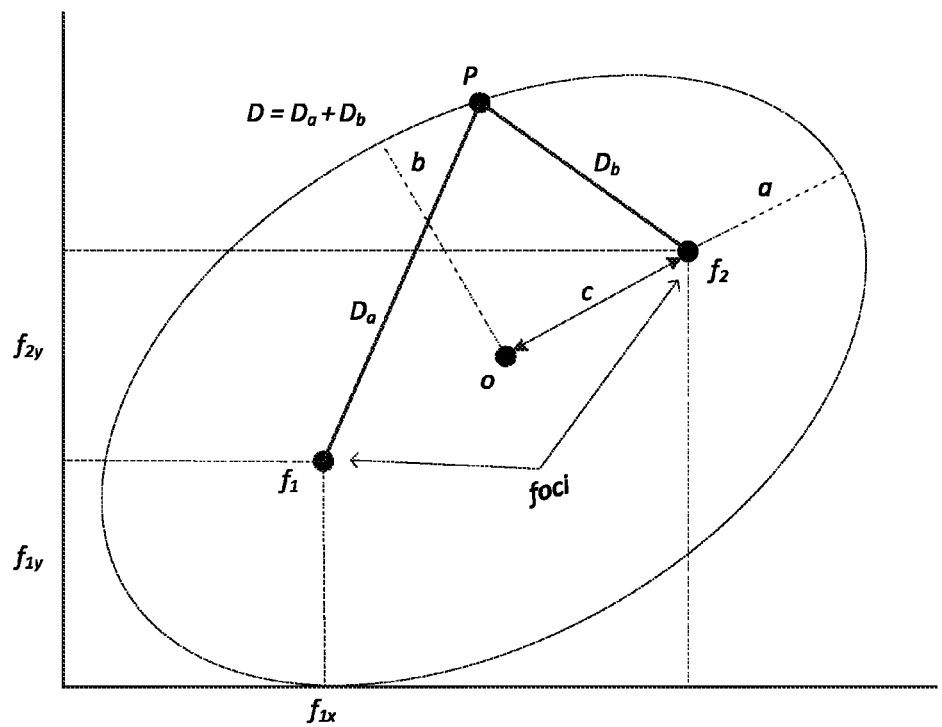
FIG. 7A illustrates one example of elliptical geometry that may be used to derive the equation of an ellipse according to an embodiment of the invention.

FIG. 7A illustrates one example of elliptical geometry that may be used to derive the equation of an ellipse according to an embodiment of the invention.

Consider the situation where the foci are defined and the round time distance D has been measured. Referring to FIG. 7A, the givens are the location of the foci and the bounce distance D. From this it can be defined that the origin "o" lies at point $$o = \frac{(f_2 + f_2)}{2} \qquad \text{Eq. 1}$$

The distance from the origin to the ellipse passing through one of the foci may be given as $$a = \frac{D}{2} \qquad \text{Eq. 2}$$

The distance from the origin to either foci may be given as $$c = \text{abs}\left(\frac{f_2 - f_1}{2}\right) \qquad \text{Eq. 3}$$

The distance from the origin to the ellipse, as measurement orthogonally to vector a, may be given as $$b = \sqrt{\frac{D^2}{4} - c^2} \qquad \text{Eq. 4}$$

The rotational angle may be the argument of the vector extending between the foci.

$$\theta = \angle(f_2 - f_1) \qquad \text{Eq. 5}$$

The coordinates of the origin may be given as $$c_x = \text{real}(o) \qquad \text{Eq. 6}$$

$$c_y = \text{imag}(o)$$

The canonical form of an ellipse (i.e. an ellipse centered at the origin with no rotational angle) may be given as $$\frac{\tilde{x}^2}{a^2} + \frac{\tilde{y}^2}{b^2} = 1 \qquad \text{Eq. 7}$$

To change the canonical form to the general form the foci may be rotated then translated.

$$\hat{x} + j\hat{y} = xe^{+j\theta} + (c_x + jc_y) = \{x\cos\theta + c_x\} + j\{x\sin\theta + c_y\} = \tilde{x} + j\tilde{y} \qquad \text{Eq. 8}$$

To change the general form to the canonical form the translation bias may be subtracted off and the foci vector may be de-rotated as shown below.

$$[(\tilde{x} - c_x) + j(\tilde{y} - c_y)]e^{-j\theta} = [(\tilde{x} - c_x) + j(\tilde{y} - c_y)] \cdot [\cos\theta - j\sin\theta] \qquad \text{Eq. 10}$$

$$= [(\tilde{x} - c_x)\cos\theta + (\tilde{y} - c_y)\sin\theta] +$$

$$j[(\tilde{y} - c_y)\cos\theta - (\tilde{x} - c_x)\sin\theta]$$

The real (x axis) and imaginary (y axis) parts may be given by:

$$x = (\tilde{x} - c_x)\cos\theta + (\tilde{y} - c_y)\sin\theta$$

$$y = (\tilde{y} - c_y)\cos\theta - (\tilde{x} - c_x)\sin\theta \qquad \text{Eq. 11}$$

The canonical form as shown in Equation 7 may be modified as shown below.

$$\frac{\{(\tilde{x} - c_x)\cos\theta + (\tilde{y} - c_y)\sin\theta\}^2}{a^2} + \frac{\{(\tilde{y} - c_y)\cos\theta - (\tilde{x} - c_x)\sin\theta\}^2}{b^2} = 1 \qquad \text{Eq. 12}$$

A change of variable may be made by dropping the tilde over the variables.

$$\frac{\{(x - c_x)\cos\theta + (y - c_y)\sin\theta\}^2}{a^2} + \frac{\{(y - c_y)\cos\theta - (x - c_x)\sin\theta\}^2}{b^2} = 1 \qquad \text{Eq. 13}$$

Expanding the square terms yields $$\frac{\left(\begin{array}{c}[x-c_x]^2\cos^2\theta + 2[x-c_x][y-c_y]\\ \cos\theta\sin\theta + [y-c_y]^2\sin^2\theta\end{array}\right)}{a^2} + \qquad \text{Eq. 14}$$

$$\frac{\left(\begin{array}{c}[x-c_x]^2\sin^2\theta - 2[x-c_x][y-c_y]\\ \cos\theta\sin\theta + [y-c_y]^2\cos^2\theta\end{array}\right)}{b^2} = 1$$

$$\frac{\left(\begin{array}{c}[x^2 - 2xc_x + c_x^2]\cos^2\theta + 2[xy - c_x y - c_y x + c_x c_y]\\ \cos\theta\sin\theta + [y^2 - 2c_y y + c_y^2]\sin^2\theta\end{array}\right)}{a^2} + \qquad \text{Eq. 15}$$

$$\frac{\left(\begin{array}{c}[x^2 - 2xc_x + c_x^2]\sin^2\theta - 2[xy - c_x y - c_y x + c_x c_y]\\ \cos\theta\sin\theta + [y^2 - 2c_y y + c_y^2]\cos^2\theta\end{array}\right)}{b^2} = 1$$

Collecting terms yields $$\left(\frac{\cos^2\theta}{a^2} + \frac{\sin^2\theta}{b^2}\right)x^2 + \qquad \text{Eq. 16}$$

$$\left(\frac{\cos^2\theta}{b^2} + \frac{\sin^2\theta}{a^2}\right)y^2 + \left(\frac{\cos\theta\sin\theta}{a^2} - \frac{\cos\theta\sin\theta}{b^2}\right)2xy -$$

$$\left(\frac{c_x\cos^2\theta + c_y\cos\theta\sin\theta}{a^2} + \frac{c_x\sin^2\theta - c_y\cos\theta\sin\theta}{b^2}\right)2x -$$

$$\left(\frac{c_y\sin^2\theta + c_x\cos\theta\sin\theta}{a^2} + \frac{+c_y\cos^2\theta - c_x\cos\theta\sin\theta}{b^2}\right)2y +$$

$$\left(\begin{array}{c}\frac{c_x^2\cos^2\theta + 2c_xc_y\cos\theta\sin\theta + c_y^2\sin^2\theta}{a^2} + \\ \frac{c_x^2\sin^2\theta - 2c_xc_y\cos\theta\sin\theta + c_y^2\cos^2\theta}{b^2}\end{array}\right) = 1$$

Rearranging terms and equating to zero yields $$(b^2\cos^2\theta + a^2\sin^2\theta)x^2 + (a^2\cos^2\theta + b^2\sin^2\theta)y^2 + (b^2\cos\theta\sin\theta - a^2\cos\theta\sin\theta)2xy - (b^2(c_x\cos^2\theta + c_y\cos\theta\sin\theta) + a^2(c_x\sin^2\theta - c_y\cos\theta\sin\theta))2x - (b^2(c_y\sin^2\theta + c_x\cos\theta\sin\theta) + a^2(c_y\cos^2\theta - c_x\cos\theta\sin\theta))2y + (b^2(c_x^2\cos^2\theta + 2c_xc_y\cos\theta\sin\theta + c_y^2\sin^2\theta) + a^2(c_x^2\sin^2\theta - 2c_xc_y\cos\theta\sin\theta + c_y^2\cos^2\theta)) - a^2b^2 = 0 \qquad \text{Eq. 17}$$

Now define the following parameters:

$$A = b^2 \cos^2 \theta + a^2 \sin^2 \theta$$

$$B = a^2 \cos^2 \theta + b^2 \sin^2 \theta$$

$$C = 2(b^2 \cos \theta \sin \theta - a^2 \cos \theta \sin \theta)$$

$$D = -2[b^2(-c_x \cos^2 \theta - c_y \cos \theta \sin \theta) + a^2(-c_x \sin^2 \theta + c_y \cos \theta \sin \theta)]$$

$$E = -2[b^2(-c_y \sin^2 \theta - c_y \cos \theta \sin \theta) + a^2(-c_y \cos^2 \theta + c_y \cos \theta \sin \theta)]$$

$$F = (b^2(c_x^2 \cos^2 \theta + 2c_x c_y \cos \theta \sin \theta + c_y^2 \sin^2 \theta) + a^2(c_x^2 \sin^2 \theta - 2c_x c_y \cos \theta \sin \theta + c_y^2 \cos^2 \theta)) - a^2 b^2 \quad \text{Eq. 18}$$

The following equation may be defined $$Ax^2 + By^2 + Cxy + Dx + Ey + F = 0 \quad \text{Eq. 19}$$

For a given value of x, Eq. 19 can be written as $$y^2 + \left(\frac{Cx + E}{B}\right) y + \left(\frac{Ax^2 + Dx + F}{B}\right) = 0 \quad \text{Eq. 20}$$

Define $$y^2 + \alpha y + \gamma = 0 \quad \text{Eq. 21}$$

where $$\alpha = \frac{Cx + E}{B} \quad \text{Eq. 22}$$

$$\gamma = \frac{Ax^2 + Dx + F}{B} \quad \text{Eq. 23}$$

Completing the square yields $$(y - h)^2 + k = 0 \quad \text{Eq. 24}$$

where $$h = -\frac{\alpha}{2} \quad \text{Eq. 25}$$

$$k = \gamma - \frac{\alpha^2}{4} \quad \text{Eq. 26}$$

then $$y = h \pm \sqrt{-k} \quad \text{Eq. 27}$$

To find the maximum and minimum x value for a given offset and rotation $$x(\theta) = c_x + a \cos(\theta)\cos(\theta) - b \sin(\theta)\sin(\theta) \quad \text{Eq. 28}$$

The inflection point may be found by taking the first derivative.

$$\frac{d[x(\vartheta)]}{d\vartheta} = -a\cos(\theta)\sin(\vartheta) - b\sin(\theta)\cos(\vartheta) = 0 \quad \text{Eq. 29}$$

The angle may be solved for the maximum.

$$\tan(\vartheta_{max}) = -\frac{b}{a}\tan(\theta) \quad \text{Eq. 30}$$

$$\vartheta_{max} = \tan^{-1}\left(-\frac{b}{a}\tan(\theta)\right)$$

Using this angle, the x minimum and maximum may be determined.

$$x_{max} = c_x + a[\cos(\theta)\cos(\theta_{max}) - b \sin(\theta)\sin(\theta_{max})] \quad \text{Eq. 31}$$

$$x_{min} = c_x - [a \cos(\theta)\cos(\theta_{max}) - b \sin(\theta)\sin(\theta_{max})] \quad \text{Eq. 32}$$

Based upon equations 31 and 32, it may be known that the domain of the x values lie between $x_{min}$ and $x_{max}$ such that the resulting range falls on the ellipse. This domain may be used, in conjunction with equation 27, to plot out the resulting ellipse.

Figure 7B:
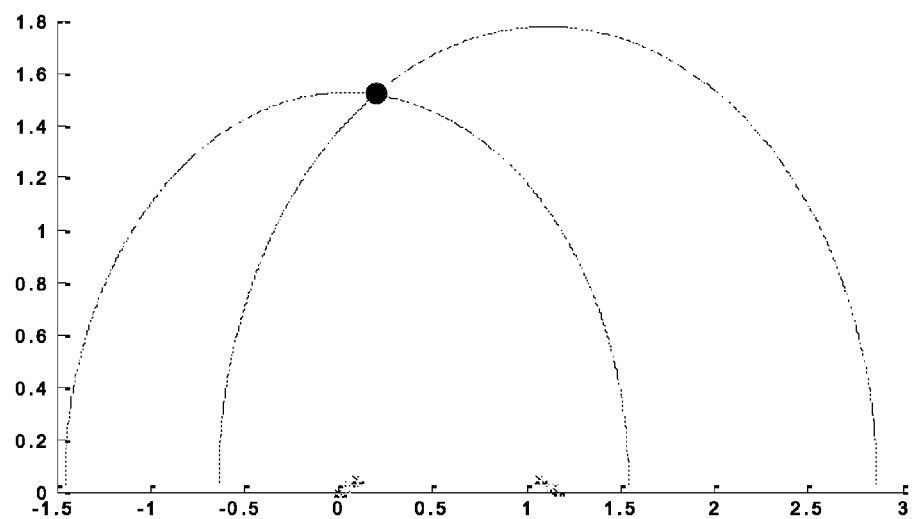
FIG. 7B illustrates two intersecting ellipses that may be used to calculate the location of an object according to an embodiment of the invention.

FIG. 7B illustrates one example of elliptical geometry that may be used to calculate the location of an object at the intersection of two ellipses according to an embodiment of the invention. Consider the case of two ellipses, expressed in parametric values as shown in equation 19, and both converging at a common intersection point.

$$A_1 x^2 + B_1 y^2 + C_1 xy + D_1 x + E_1 y + F_1 = 0$$

$$A_2 x^2 + B_2 y^2 + C_2 xy + D_2 x + E_2 y + F_2 = 0 \quad \text{Eq. 33}$$

Following the method leading up to equation 27, two equations expressing the same y value may be written.

$$y = h_1 \pm \sqrt{-k_1} \quad \text{Eq. 34}$$

$$= -\frac{\alpha_1}{2} \pm \sqrt{-\gamma_1 + \frac{\alpha_1^2}{4}}$$

$$= -\frac{C_1 x + E_1}{2B_1} \pm \sqrt{-\frac{A_1 x^2 + D_1 x + F_1}{B_1} + \frac{1}{4}\left(\frac{C_1 x + E_1}{B_1}\right)^2}$$

$$y = h_2 \pm \sqrt{-k_2} \quad \text{Eq. 35}$$

$$= -\frac{\alpha_2}{2} \pm \sqrt{\gamma_2 - \frac{\alpha_2^2}{4}}$$

$$= -\frac{C_2 x + E_2}{2B_2} \pm \sqrt{-\frac{A_2 x^2 + D_2 x + F_2}{B_2} + \frac{1}{4}\left(\frac{C_2 x + E_2}{B_2}\right)^2}$$

Equating equations 34 and 35 we get:

$$-\frac{C_1 x + E_1}{2B_1} \pm \sqrt{-\frac{A_1 x^2 + D_1 x + F_1}{B_1} + \frac{1}{4}\left(\frac{C_1 x + E_1}{B_1}\right)^2} = -\frac{C_2 x + E_2}{2B_2} \pm \sqrt{-\frac{A_2 x^2 + D_2 x + F_2}{B_2} + \frac{1}{4}\left(\frac{C_2 x + E_2}{B_2}\right)^2} \quad \text{Eq. 36}$$

For the special case where there is no rotation and the light sources 110-a, 110-b and light receiver 120 are in a linear row it is observed that $C_1 = E_1 = C_2 = E_2 = 0$. This can be termed the collinear solution.

Equation 36 may be rewritten as $$\pm \sqrt{-\frac{A_1 x^2 + D_1 x + F_1}{B_1}} = \pm \sqrt{-\frac{A_2 x^2 + D_2 x + F_2}{B_2}} \quad \text{Eq. 37}$$

Squaring both sides yields $$\frac{A_1 x^2 + D_1 x + F_1}{B_1} = \frac{A_2 x^2 + D_2 x + F_2}{B_2} \quad \text{Eq. 38}$$

Collecting terms yields $$x^2(A_1B_2-A_2B_1)+x(D_1B_2-D_2B_1)+(F_1B_2-F_2B_1)=0 \qquad \text{Eq. 39}$$

Let $$\sigma=A_1B_2-A_2B_1$$

$$\nu=D_1B_2-D_2B_1$$

$$\mu=F_1B_2-F_2B_1 \qquad \text{Eq. 40}$$

Equation 39 can be rewritten in a parametric quadratic equation form as $$x^2\sigma+x\nu+\mu=0 \qquad \text{Eq. 41}$$

This can be solved using the quadratic formula, yielding $$x = \frac{-\nu \pm \sqrt{\nu^2 - 4\sigma\mu}}{2\sigma} \qquad \text{Eq. 42}$$

Equation 42 may be substituted back into equation 34 or 35 to solve for y. The object 250 location may now be known as the point (x,y) that was just calculated.

The general solution in which there may be rotation and the light sources 110-a, 110-b and light receiver 120 are not necessarily in a linear row can be solved starting with equation 36 (reproduced below).

$$-\frac{C_1x+E_1}{2B_1} \pm \sqrt{-\frac{A_1x^2+D_1x+F_1}{B_1}+\frac{1}{4}\left(\frac{C_1x+E_1}{B_1}\right)^2} = \qquad \text{Eq. 36}$$

$$-\frac{C_2x+E_2}{2B_2} \pm \sqrt{-\frac{A_2x^2+D_2x+F_2}{B_2}+\frac{1}{4}\left(\frac{C_2x+E_2}{B_2}\right)^2}$$

Collecting the radicals on the right side yields $$x\left(\frac{C_2}{2B_2}-\frac{C_1}{2B_1}\right)+\left(\frac{E_2}{2B_2}-\frac{E_1}{2B_1}\right) = \qquad \text{Eq. 43}$$

$$\mp\sqrt{-\frac{A_1x^2+D_1x+F_1}{B_1}+\frac{1}{4}\left(\frac{C_1x+E_1}{B_1}\right)^2} \pm$$

$$\sqrt{-\frac{A_2x^2+D_2x+F_2}{B_2}+\frac{1}{4}\left(\frac{C_2x+E_2}{B_2}\right)^2}$$

Squaring both sides of the equation yields $$x^2\left(\frac{C_2}{2B_2}-\frac{C_1}{2B_1}\right)^2+2x\left(\frac{C_2}{2B_2}-\frac{C_1}{2B_1}\right)\left(\frac{E_2}{2B_2}-\frac{E_1}{2B_1}\right)+ \qquad \text{Eq. 44}$$

$$\left(\frac{E_2}{2B_2}-\frac{E_1}{2B_1}\right)^2 = \frac{1}{4}\left(\frac{C_1x+E_1}{B_1}\right)^2 - \frac{A_1x^2+D_1x+F_1}{B_1} -$$

$$2\sqrt{-\frac{A_1x^2+D_1x+F_1}{B_1}+\frac{1}{4}\left(\frac{C_1x+E_1}{B_1}\right)^2}$$

$$\sqrt{-\frac{A_2x^2+D_2x+F_2}{B_2}+\frac{1}{4}\left(\frac{C_2x+E_2}{B_2}\right)^2} +$$

$$\frac{1}{4}\left(\frac{C_2x+E_2}{B_2}\right)^2 - \frac{A_2x^2+D_2x+F_2}{B_2}$$

Moving the radicals to the right side of the equation yields $$x^2\left(\frac{C_2}{2B_2}-\frac{C_1}{2B_1}\right)^2+2x\left(\frac{C_2}{2B_2}-\frac{C_1}{2B_1}\right)\left(\frac{E_2}{2B_2}-\frac{E_1}{2B_1}\right)+ \qquad \text{Eq. 45}$$

$$\left(\frac{E_2}{2B_2}-\frac{E_1}{2B_1}\right)^2 - \frac{1}{4}\left(\frac{C_1x+E_1}{B_1}\right)^2 + \frac{A_1x^2+D_1x+F_1}{B_1} -$$

$$\frac{1}{4}\left(\frac{C_2x+E_2}{B_2}\right)^2 + \frac{A_2x^2+D_2x+F_2}{B_2} =$$

$$-2\sqrt{-\frac{A_1x^2+D_1x+F_1}{B_1}+\frac{1}{4}\left(\frac{C_1x+E_1}{B_1}\right)^2}$$

$$\sqrt{-\frac{A_2x^2+D_2x+F_2}{B_2}+\frac{1}{4}\left(\frac{C_2x+E_2}{B_2}\right)^2}$$

Expanding the left side of the equation yields $$x^2\left(\frac{C_2}{2B_2}-\frac{C_1}{2B_1}\right)^2+2x\left(\frac{C_2}{2B_2}-\frac{C_1}{2B_1}\right)\left(\frac{E_2}{2B_2}-\frac{E_1}{2B_1}\right)+ \qquad \text{Eq. 46}$$

$$\left(\frac{E_2}{2B_2}-\frac{E_1}{2B_1}\right)^2 - \frac{1}{4}\frac{C_1^2x^2}{B_1^2} - \frac{1}{4}\frac{2xC_1E_1}{B_1^2} -$$

$$\frac{1}{4}\frac{E_1^2}{B_1^2} + \frac{A_1x^2}{B_1} + \frac{D_1x}{B_1} + \frac{F_1}{B_1} - \frac{1}{4}\frac{C_2^2x^2}{B_2^2} -$$

$$\frac{1}{4}\frac{2xC_2E_2}{B_2^2} - \frac{1}{4}\frac{E_2^2}{B_2^2} + \frac{A_2x^2}{B_2} + \frac{D_2x}{B_2} + \frac{F_2}{B_2} =$$

$$-2\sqrt{-\frac{A_1x^2+D_1x+F_1}{B_1}+\frac{1}{4}\left(\frac{C_1x+E_1}{B_1}\right)^2}$$

$$\sqrt{-\frac{A_2x^2+D_2x+F_2}{B_2}+\frac{1}{4}\left(\frac{C_2x+E_2}{B_2}\right)^2}$$

Collecting terms to form a quadratic equation on the left side yields $$x^2\left\{\left(\frac{C_2}{2B_2}-\frac{C_1}{2B_1}\right)^2 - \frac{1}{4}\frac{C_1^2}{B_1^2} + \frac{A_1}{B_1} - \frac{1}{4}\frac{C_2^2}{B_2^2} + \frac{A_2}{B_2}\right\}+ \qquad \text{Eq. 47}$$

$$x\left\{2\left(\frac{C_2}{2B_2}-\frac{C_1}{2B_1}\right)\left(\frac{E_2}{2B_2}-\frac{E_1}{2B_1}\right)-\right.$$

$$\left.\frac{1}{2}\frac{C_1E_1}{B_1^2} + \frac{D_1}{B_1} - \frac{1}{2}\frac{C_2E_2}{B_2^2} + \frac{D_2}{B_2}\right\}+$$

$$\left\{\left(\frac{E_2}{2B_2}-\frac{E_1}{2B_1}\right)^2 - \frac{1}{4}\frac{E_1^2}{B_1^2} + \frac{F_1}{B_1} - \frac{1}{4}\frac{E_2^2}{B_2^2} + \frac{F_2}{B_2}\right\} =$$

$$-2\sqrt{-\frac{A_1x^2+D_1x+F_1}{B_1}+\frac{1}{4}\left(\frac{C_1x+E_1}{B_1}\right)^2}$$

$$\sqrt{-\frac{A_2x^2+D_2x+F_2}{B_2}+\frac{1}{4}\left(\frac{C_2x+E_2}{B_2}\right)^2}$$

Expressing equation 47 in terms of parametric parameters yields $$G = \left(\frac{C_2}{2B_2}-\frac{C_1}{2B_1}\right)^2 - \frac{1}{4}\frac{C_1^2}{B_1^2} + \frac{A_1}{B_1} - \frac{1}{4}\frac{C_2^2}{B_2^2} + \frac{A_2}{B_2} \qquad \text{Eq. 48}$$

$$H = \qquad \text{Eq. 49}$$

$$2\left(\frac{C_2}{2B_2}-\frac{C_1}{2B_1}\right)\left(\frac{E_2}{2B_2}-\frac{E_1}{2B_1}\right) - \frac{1}{2}\frac{C_1E_1}{B_1^2} + \frac{D_1}{B_1} - \frac{1}{2}\frac{C_2E_2}{B_2^2} + \frac{D_2}{B_2}$$

-continued $$I = \left(\frac{E_2}{2B_2} - \frac{E_1}{2B_1}\right)^2 - \frac{1}{4}\frac{E_1^2}{B_1^2} + \frac{F_1}{B_1} - \frac{1}{4}\frac{E_2^2}{B_2^2} + \frac{F_2}{B_2}$$ Eq. 50

$$x^2G + xH + I = -2\sqrt{-\frac{A_1x^2 + D_1x + F_1}{B_1} + \frac{1}{4}\left(\frac{C_1x + E_1}{B_1}\right)^2}$$

$$\sqrt{-\frac{A_2x^2 + D_2x + F_2}{B_2} + \frac{1}{4}\left(\frac{C_2x + E_2}{B_2}\right)^2}$$ Eq. 51

Squaring both sides of equation 51 yields $$x^4G^2 + 2GHx^3 + x^2(2GI + H^2) + 2xHI + I^2 =$$ Eq. 52

$$4\left\{-\frac{A_1x^2 + D_1x + F_1}{B_1} + \frac{1}{4}\left(\frac{C_1x + E_1}{B_1}\right)^2\right\}$$

$$\left\{-\frac{A_2x^2 + D_2x + F_2}{B_2} + \frac{1}{4}\left(\frac{C_2x + E_2}{B_2}\right)^2\right\}$$

Collecting terms yields $$x^4G^2 + x^3(2GH) + x^2(2GI + H^2) + x(2HI) + I^2 =$$ Eq. 53

$$4\left\{x^2\left(\frac{C_1^2}{4B_1^2} - \frac{A_1}{B_1}\right) + x\left(\frac{2C_1E_1}{4B_1^2} - \frac{D_1}{B_1}\right) + \left(\frac{E_1^2}{4B_1^2} - \frac{F_1}{B_1}\right)\right\}$$

$$\left\{x^2\left(\frac{C_2^2}{4B_2^2} - \frac{A_2}{B_2}\right) + x\left(\frac{2C_2E_2}{4B_2^2} - \frac{D_2}{B_2}\right) + \left(\frac{E_2^2}{4B_2^2} - \frac{F_2}{B_2}\right)\right\}$$

Defining the following parameters yields $$J = \frac{C_1^2}{4B_1^2} - \frac{A_1}{B_1}$$ Eq. 54

$$K = \frac{2C_1E_1}{4B_1^2} - \frac{D_1}{B_1}$$ Eq. 55

$$L = \frac{E_1^2}{4B_1^2} - \frac{F_1}{B_1}$$ Eq. 56

$$M = \frac{C_2^2}{4B_2^2} - \frac{A_2}{B_2}$$ Eq. 57

$$N = \frac{2C_2E_2}{4B_2^2} - \frac{D_2}{B_2}$$ Eq. 58

$$O = \frac{E_2^2}{4B_2^2} - \frac{F_2}{B_2}$$ Eq. 59

Equation 53 may be rewritten as shown below.

$$x^4G^2 + x^3(2GH) + x^2(2GI+H^2) + x(2HI) + I^2 = 4\{x^2J+xK+L\}\{x^2M+xN+O\}$$ Eq. 60

Expanding the right side yields $$x^4G^2+x^3(2GH)+x^2(2GI+H^2)+x(2HI)+I^2=x^44JM+x^34(JN+KM)+x^24(JO+KN+LM)+x4(KO+LN)+4LO$$ Eq. 61

Collecting terms and equating to zero yields $$x^4(G^2-4JM)+x^3(2GH-4JN-4KM)+x^2(2GI+H^2-4JO-4KN-4LM)+x(2HI-4KO-4LN)+(I^2-4LO)=0$$ Eq. 62

Defining the following parameters yields $$Q = G^2 - 4JM$$ Eq. 63

$$V = \frac{2GH - 4JN - 4KM}{Q}$$ Eq. 64

$$S = \frac{2GI + H^2 - 4JO - 4KN - 4LM}{Q}$$ Eq. 65

$$W = \frac{2HI - 4KO - 4LN}{Q}$$ Eq. 66

$$U = \frac{I^2 - 4LO}{Q}$$ Eq. 67

Equation 62 may be rewritten in a quartic form as $$x^4+x^3V+x^2S+xW+U=0$$ Eq. 68

A quartic solver method in which the four roots of Equation 68 (r1, r2, r3 and r4) are solved by the following method may be used.

Defining the following parameters yields $$T1 = -\frac{V}{4}$$ Eq. 69

$$T2 = S^2 - 3VW - 12U$$ Eq. 70

$$T3 = \frac{2S^3 - 9VSW + 27W^2 + 27V^2U - 72SU}{2}$$ Eq. 71

$$T4 = \frac{4VS - V^3 - 8W}{32}$$ Eq. 72

$$T5 = \frac{3V^2 - 8S}{48}$$ Eq. 73

$$R1 = \sqrt{T3^2 - T2^3}$$ Eq. 74 if imag(T3 − R1) = 0 and real(T3 − R1) < 0 then
R2 = −abs(T3 − R1)$^{1/3}$
else
R2 = (T3 − R1)$^{1/3}$ Eq. 75

$$R3 = \frac{\frac{T2}{R2} + R2}{12}$$ Eq. 76

$$R4 = \sqrt{T5 + R3}$$ Eq. 77

$$R5 = 2 \cdot T5 - R3$$ Eq. 78

$$R6 = \frac{T4}{R4}$$ Eq. 79

Based upon these defined parameters, the four roots of equation 68 may be solved for as according to $$r1 = T1 - R4 - \sqrt{R5 - R6}$$ Eq. 80

$$r2 = T1 - R4 + \sqrt{R5 - R6}$$ Eq. 81

$$r3 = T1 + R4 - \sqrt{R5 + R6}$$ Eq. 82

$$r4 = T1 + R4 + \sqrt{R5 + R6}$$ Eq. 83

Referring to FIG. 7B, of the four roots that define an x value, the real roots may be kept. In general, the way the problem was defined in FIG. 7B, two of the roots will be real and equal valued. However, in general this may not be the case as shown in FIG. 7C where the x values at the intersection are not necessarily equal depending upon how the reference plane has been defined.

Figure 7C:
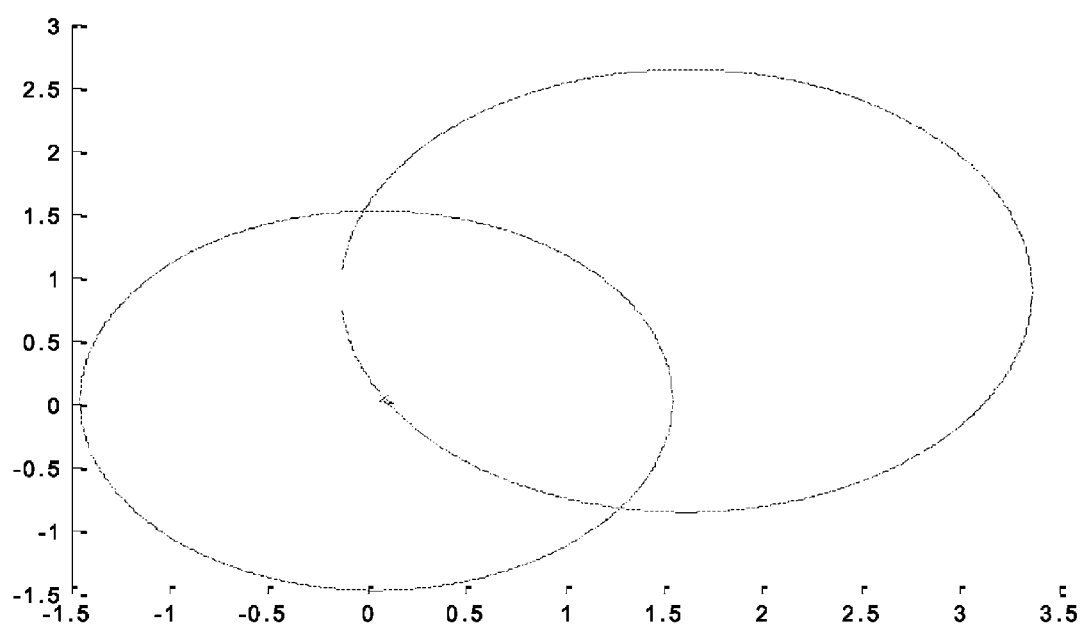
FIG. 7C illustrates another example of two intersecting ellipses that may be used to calculate the location of an object according to an embodiment of the invention.

In the case represented by FIG. 7C the goal may be to find the x value that yields a real and positive y value while also satisfying the measured bounce distance $D_b$. To find that y value, we substitute the appropriate root from equations 80 through 83 back into either equation 34 or 35 and solve for y.

$$e.g. \ x = \left\{ \begin{pmatrix} r_1 \\ r_2 \\ r_3 \\ r_4 \end{pmatrix} \right\}$$

Included herein are one or more flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 8 illustrates one embodiment of a logic flow in which the distance to an object may be calculated. The logic flow 800 may be representative of some or all of the operations executed by one or more embodiments described herein.

In the illustrated embodiment shown in FIG. 8, the logic flow 800 may emit modulated light from first and second light sources 110-a, 110-b at block 810. For example, the first and second light sources 110-a, 110-b may be integrated into the taillights of an automobile 210. The first and second light sources 110-a, 110-b may be comprised of multiple LEDs 115. A modulation component 140 under the control of a processor circuit 130 may modulate the first and second light sources 110-a, 110-b to pulse on and off at a specified frequency. This may be termed on-off keying (OOK) and creates a ranging tone for the light sources 110-a, 110-b. The ranging tone for the first light source 110-a may be different from the ranging tone for the second light source 110-b so as to be able to distinguish light emitted from each. The embodiments are not limited to this example.

The logic flow 800 may detect modulated light in a light receiver 120 that has been reflected off an object 250 at block 820. For example, the modulated light emitted by the first and second light sources 110-a, 110-b may reflect or bounce off an object 250. The reflected modulated light may then enter the light receiver 120 where it can undergo processing. The embodiments are not limited to this example.

The logic flow 800 may filter the incoming reflected light at block 830. For example, the light received by the light receiver 120 may be converted to signals that can be filtered according to the modulation scheme implemented at the first and second light sources 110-a, 110-b. A filtering component 160 under control of a processor circuit 130 may be operative to screen out any signals that do not match either the first or second ranging tones that may be associated with light emitted from the first and second light sources 110-a, 110-b. The embodiments are not limited to this example.

The logic flow 800 may process the filtered signals to determine the location of the object 250 at block 840. For example, the processing circuit 130 may be able to calculate the location of the object 250 knowing several pieces of information and using elliptical geometry. For instance, the first light source 110-a and the light receiver 120 can be used as the foci for a first ellipse if the propagation delay for light emitted by the first light source 110-a and received by the light receiver 120 after bouncing off the object 250 can be determined. Similarly, the first light source 110-a and the light receiver 120 can be used as the foci for a second ellipse if the propagation delay for light emitted by the second light source 110-b and received by the light receiver 120 after bouncing off the object 250 can be determined. Recall that the first and second light sources 110-a, 110-b and the light receiver 120 are all in fixed and known positions. The two ellipses will intersect at a point where the object 250 is located. Based on the known information, the location for the object can be calculated. The embodiments are not limited to this example.

Figure 9:
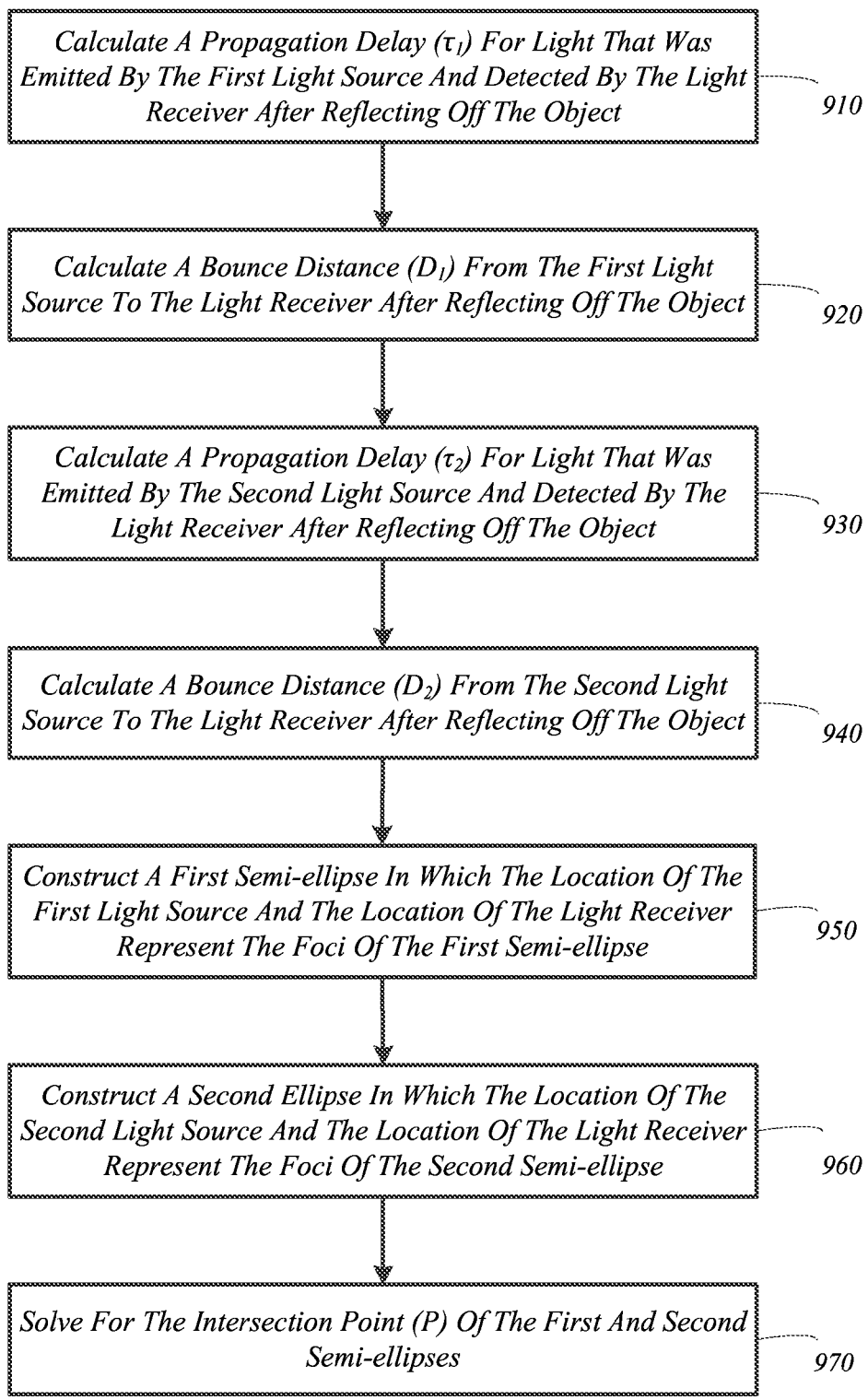
FIG. 9 illustrates another embodiment of a logic flow.

FIG. 9 illustrates another embodiment of a logic flow 840 in which the distance of an object may be calculated. The logic flow 840 may be representative of some or all of the operations executed by one or more embodiments described herein.

In the illustrated embodiment shown in FIG. 9, the logic flow 840 may calculate a propagation delay ($\tau_1$) for light that was emitted by the first light source 110-a and detected by the light receiver 120 after reflecting off the object 250 at block 910. For example, the first light source 110-a located at a known and fixed position ($x_t$, $y_t$) may emit modulated light which may strike the object 250 and be reflected to the light receiver 120 at a known and fixed position ($x_r$, $y_r$). It may take a certain time $\tau_t$ for the emitted light to reach the object and another time $\tau_r$ to reach the light receiver 120. The total time delay from the first light source 110-a to light receiver 120 can be represented by $\tau_1 = \tau_t + \tau_r$. The embodiments are not limited to this example.

The logic flow 840 may calculate a bounce distance ($D_1$) from the first light source 110-a to the light receiver 120 after reflecting off the object 250 at block 920. For example, the distance from the first light source 110-a to the object 250 to the light receiver 120 can be calculated as:

$$D_1 = c * \tau_1$$

in which c is the speed of light. The embodiments are not limited to this example.

The logic flow 840 may calculate a propagation delay ($\tau_2$) for light that was emitted by the second light source 110-b and detected by the light receiver 120 after reflecting off the object 250 at block 930. For example, the second light source 110-b located at a known and fixed position ($x_t$, $y_t$) may emit modulated light which may strike the object 250 and be reflected to the light receiver 120 at a known and fixed position ($x_r$, $y_r$). It may take a certain time $\tau_t$ for the emitted light to reach the object and another time $\tau_r$ to reach the light receiver 120. The total time delay from the second light source 110-b to light receiver 120 can be represented by $\tau_2 = \tau_t + \tau_r$. The embodiments are not limited to this example.

The logic flow 840 may calculate a bounce distance ($D_1$) from the second light source 110-b to the light receiver 120 after reflecting off the object 250 at block 940. For example, the distance from the second light source 110-b to the object 250 to the light receiver 120 can be calculated as:

$$D_2 = c * \tau_2$$

in which c is the speed of light. The embodiments are not limited to this example.

The logic flow 840 may construct a first semi-ellipse in which the location of the first light source 110-a and the location of the light receiver 120 represent the foci of the first semi-ellipse at block 950. For example, the location of the first light source 110-a and the location of the light receiver 120 are both known. The time delay for light emitted from the first light source 110-a to the light receiver 120 after bouncing off object 250 is also known. The distance from the first light source 110-a to the light receiver 120 after bouncing off object 250 has been calculated. Knowing these pieces of information allows for the construction of the semi-ellipse using the math described with respect to FIG. 7A above. The embodiments are not limited to this example.

The logic flow 840 may construct a first semi-ellipse in which the location of the first light source 110-b and the location of the light receiver 120 represent the foci of the first semi-ellipse at block 960. For example, the location of the second light source 110-b and the location of the light receiver 120 are both known. The time delay for light emitted from the first light source 110-b to the light receiver 120 after bouncing off object 250 is also known. The distance from the second light source 110-b to the light receiver 120 after bouncing off object 250 has been calculated. Knowing these pieces of information allows for the construction of the semi-ellipse using the math described with respect to FIG. 7A above. In addition, the intersection point (P) of the two ellipses represents the location of object 250. The embodiments are not limited to this example.

The logic flow 840 may solve for the intersection point (P) of the first and second semi-ellipses at block 970. For example, the semi-ellipses have been constructed according to the math associated with FIG. 7A above and the intersection point (P) of the two ellipses represents the location of object 250. The intersection point (P) can be represented in the Cartesian coordinate system as an (x,y) value. The equations for the two ellipses may have been derived as previously described. Because they intersect, the two ellipses share a common point which happens to be the object location. That point can be solved for using the math described above with reference to FIGS. 7B-C. The embodiments are not limited to this example.

Figure 10:
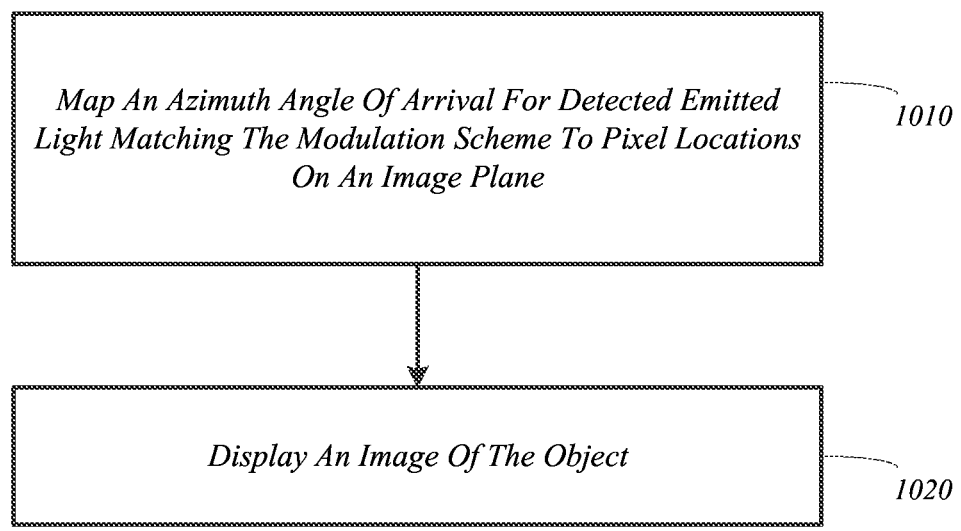
FIG. 10 illustrates another embodiment of a logic flow.

FIG. 10 illustrates one embodiment of a logic flow 1000 in which an image of the object 250 may be displayed on a display 180. The logic flow 1000 may be representative of some or all of the operations executed by one or more embodiments described herein.

In the illustrated embodiment shown in FIG. 10, the logic flow 1000 may map an azimuth angle of arrival for detected emitted light matching the modulation scheme to pixel locations on an image plane at block 1010. For example, light may enter a lensed detector array 170. The lensed detector array 170 may be comprised of a lens 310 and a linear detector array 320. Light reflected 230 of the object 250 may enter lens 310. The lensed detector array 170 may be operative to map an azimuth angle of arrival for detected emitted light that has been reflected off an object and that matches the first or second OOK ranging tones to pixel locations on an image plane of the linear detector array 320.

The logic flow 1000 may display an image of the object 250 at block 1020. For example, a display 180 may be communicatively coupled with the lensed detector array 170 and may be operative to display the mapped pixel locations to create an image of the object 250 reflecting the emitted light. The embodiments are not limited to this example.

The processor circuit 130 may also cause an alert to be issued based on the location of the object 250. For instance, the processor circuit 130 may be communicatively coupled with other applications and components such as the display 180 and a speaker 185. Based on the location of the object a visual alert may be displayed on display 180 to alert a human operator as to the existence and location of the object. Moreover, the distance of the object determined by the calculation application 165 may be displayed on the display along with a rendering of the object. The distance may be used as a threshold value when determining whether to initiate an alert. Similarly, an audible alert may be emitted from speaker 185 to alert a human operator as to the existence of the object. The audible alert may change in pitch, frequency and/or tone as the distance to the object gets closer and/or crosses a threshold distance. The embodiments are not limited in this context.

It should be noted that the number of light sources and light receivers can vary so long as there are a combined number equal to or greater than three (3). Each distinct light source/light receiver pairing can create an ellipse based on light bounced of an object 250. Thus, two ellipses bouncing light off the same object will intersect at a common point which happens to be the location of the object 250. The location of the object 250 can only be solved for if there at least two intersecting ellipses. However, there can be more intersecting ellipses. For instance, a second light receiver may be added which would double the number of intersecting ellipses created to four (4). The math is still the same.

The present description has illustrated two light sources and a single light receiver which will generate two ellipses. This configuration was chosen because the light sources may be integrated into an automobile's 210 existing taillights of which there are two. Another configuration could be one light source and two light receivers. Such a configuration would also generate two ellipses intersecting at the location of the object 250. This configuration may be implemented on a motorcycle. For instance, the light source may be integrated into the headlight and the light receivers may be integrated into the handle bars of a motorcycle. The embodiments are not limited to these examples.

Figure 11:
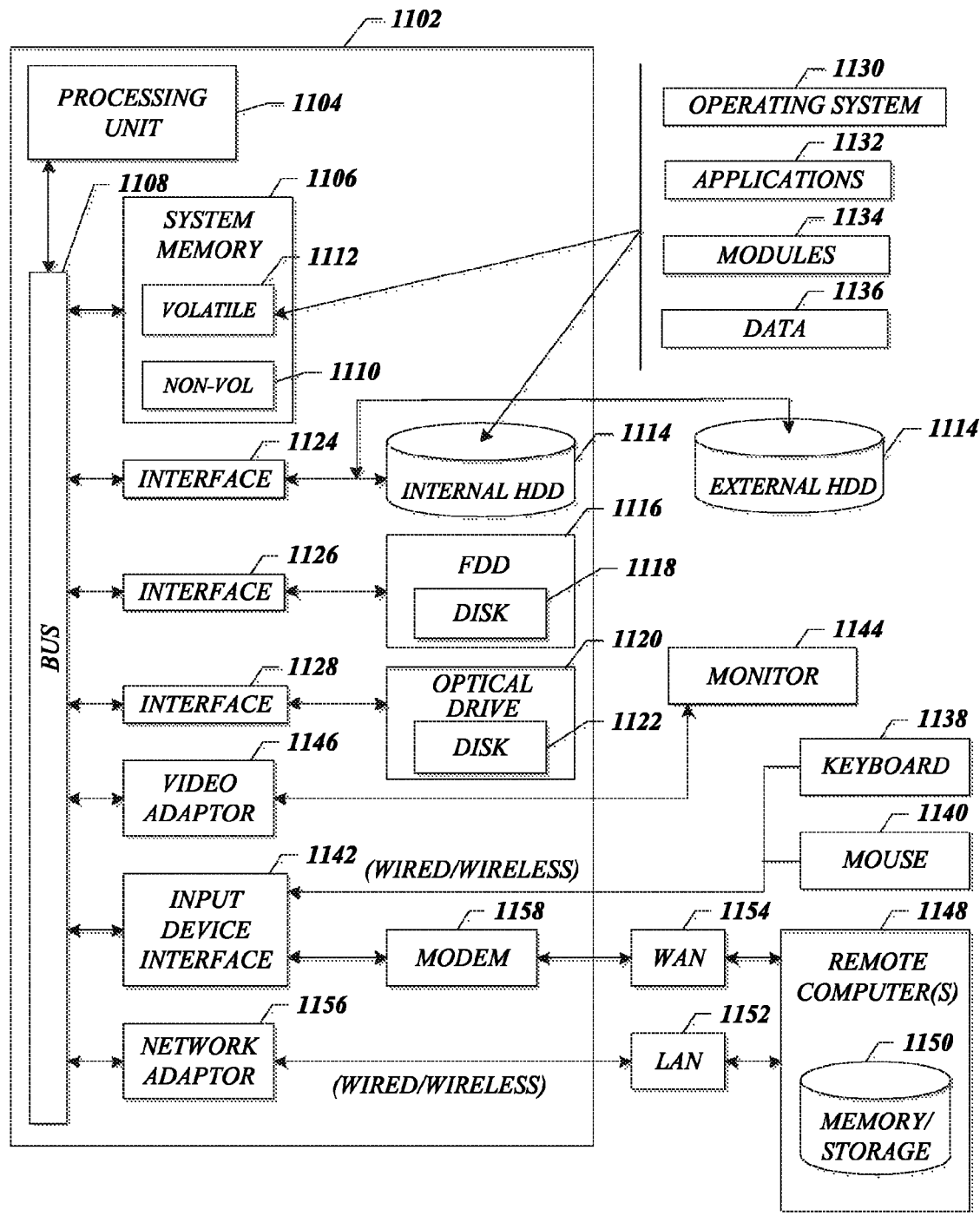
FIG. 11 illustrates one embodiment of a computing architecture.

FIG. 11 illustrates an embodiment of an exemplary computing architecture 1100 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1100 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1100 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors. Dual microprocessors and other multi processor architectures may also be employed as the processing unit 1104. The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures.

The computing architecture 1100 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 6, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136.

A user can enter commands and information into the computer 1102 through one or more wire/wireless input devices, for example, a keyboard 1138 and a pointing device, such as a mouse 1140. Other input devices may include a microphone, an infra-red (IR) remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A location detection system comprising:
   first and second light sources to couple to a single vehicle, the first light source in a fixed and known position and operative to emit modulated light to create a first on-off key (OOK) ranging tone, the second light source in a fixed and known position relative to the first light source and operative to emit modulated light to create a second OOK ranging tone, the second OOK ranging tone different than the first OOK ranging tone;
   a light receiver operative to detect light emitted by the first and second light sources that has been reflected back off an object, the light receiver in a fixed and known position relative to the first and second light sources, the light receiver comprising a lensed detector array, the lensed detector array operative to map an azimuth angle of arrival for detected emitted light that matches the first OOK ranging tone or the second OOK ranging tones to pixel locations on an image plane; and
   a processor circuit communicatively coupled with the light receiver and the first and second light sources, the processor circuit operative to:
      receive signals from the light receiver, the signals indicative of the detected reflected emitted light; and
      process the signals to determine a location of the object that reflected the emitted light.

2. The location detection system of claim 1 wherein the processor circuit further comprises:
   a filtering component operative to filter the signals received from the light receiver to disregard light not matching the first or second OOK ranging tones.

3. The location detection system of claim 2 wherein the processor circuit is operative to:
   calculate a propagation delay ($\tau_1$) for light that was emitted by the first light source and detected by the light receiver after reflecting off the object;
   calculate a bounce distance ($D_1$) from the first light source to the light receiver after reflecting off the object;
   calculate a propagation delay ($\tau_2$) for light that was emitted by the second light source and detected by the light receiver after reflecting off the object;
   calculate a bounce distance ($D_2$) from the second light source to the light receiver after reflecting off the object;
   construct a first ellipse in which the location of the first light source and the location of the light receiver represent the foci of the first ellipse;
   construct a second ellipse in which the location of the second light source and the location of the light receiver represent the foci of the second ellipse, wherein an intersection point (P) of the first and second ellipse defines the object location; and
   solve for the intersection point (P) of the first and second ellipses using the known foci locations for the first and second ellipses, the propagation delay $\tau_1$, the propagation delay $\tau_2$, the bounce distance $D_1$, and the bounce distance $D_2$.

4. The location detection system of claim 3 wherein the processing circuit is operative to:
calculate $\tau_1$ by comparing a first transmit phase, $\tau_{t1}$, for emitted light emitted from the first light source with a first receive phase, $\tau_{r1}$, for detected light wherein $\tau_1 = \tau_{t1} + \tau_{r1}$;
calculate $\tau_2$ by comparing a second transmit phase, $\tau_{t2}$, for emitted light emitted from the second light source with a second receive phase, $\tau_{r2}$, for detected light wherein $\tau_2 = \tau_{t2} + \tau_{r2}$;
calculate $D_1$ by multiplying the propagation delay $\tau_1$ by the speed of light (c); and
calculate $D_2$ by multiplying the propagation delay $\tau_2$ by the speed of light (c).

5. The location detection system of claim 1 further comprising:
a display communicatively coupled with the lensed detector array, the display operative to display the mapped pixel locations.

6. The location detection system of claim 1 wherein the first light source is a light emitting diode (LED) and the second light source is an LED.

7. The location detection system of claim 1 wherein the processor circuit is operative to initiate an action based on the location of the object.

8. The location detection system of claim 1 wherein the vehicle comprises one of an automobile and a motorcycle.

9. The location detection system of claim 1 wherein the first light source is integrated into a first taillight of the single vehicle and the second light source is integrated into a second taillight of the single vehicle.

10. A method comprising:
emitting light from a first light source to create a first on-off key (OOK) ranging tone, the first light source coupled to a single vehicle in a fixed and known position;
emitting light from a second light source to create a second OOK ranging tone different from the first OOK ranging tone, the second light source coupled to the single vehicle in a fixed and known position relative to the first light source;
detecting light that has been reflected back off an object in a light receiver in a fixed and known position relative to the first and second light sources, the light receiver operative to detect light emitted by the first and second light sources;
mapping an azimuth angle of arrival for detected emitted light matching the first or second OOK ranging tones to pixel locations on an image plane;
receiving signals from the light receiver, the signals indicative of the detected reflected emitted light; and
processing the signals to determine a location of the object that reflected the emitted light.

11. The method of claim 10 further comprising:
filtering the signals received from the light receiver to disregard light not matching the first or second OOK ranging tones.

12. The method of claim 11 further comprising:
calculating a propagation delay ($\tau_1$) for light that was emitted by the first light source and detected by the light receiver after reflecting off the object;
calculating a bounce distance ($D_1$) from the first light source to the light receiver after reflecting off the object;
calculating a propagation delay ($\tau_2$) for light that was emitted by the second light source and detected by the light receiver after reflecting off the object;
calculating a bounce distance ($D_2$) from the second light source to the light receiver after reflecting off the object;
constructing a first ellipse in which the location of the first light source and the location of the light receiver represent the foci of the first ellipse;
constructing a second ellipse in which the location of the second light source and the location of the light receiver represent the foci of the second ellipse, wherein an intersection point (P) of the first and second ellipses defines the object location; and
solving for the intersection point (P) of the first and second ellipses using the known foci locations for the first and second ellipses, the propagation delay $\tau_1$, the propagation delay $\tau_2$, the bounce distance $D_1$, and the bounce distance $D_2$.

13. The method of claim 12 further comprising:
calculating $\tau_1$ by comparing a first transmit phase, $\tau_{t1}$, for emitted light emitted from the first light source with a first receive phase, $\tau_{r1}$, for detected light wherein $\tau_1 = \tau_{t1} + \tau_{r1}$;
calculating $\tau_2$ by comparing a second transmit phase, $\tau_{t2}$, for emitted light emitted from the second light source with a second receive phase, $\tau_{r2}$, for detected light wherein $\tau_2 = \tau_{t2} + \tau_{r2}$;
calculating $D_1$ by multiplying the propagation delay $\tau_1$ by the speed of light (c); and
calculating $D_2$ by multiplying the propagation delay $\tau_2$ by the speed of light (c).

14. The method of claim 10 further comprising displaying an image of the mapped pixel locations.

15. The method of claim 10 further comprising:
initiating an action based on the location of the object.

16. The method of claim 11 wherein the vehicle comprises one of an automobile and a motorcycle.

17. A location detection system comprising:
one or more light sources to couple to a single vehicle and operative to emit modulated light, a first light source of the one or more light sources in a fixed and known position and creating a first on-off key (OOK) ranging tone different from a second OOK ranging tone emitted by a second light source of the one or more light sources;
one or more light receivers to couple to the single vehicle operative to detect light emitted by the one or more light sources that has been reflected back off an object, each of the one or more light receivers in a fixed and known position;
a lensed detector array operative to map an azimuth angle of arrival for detected emitted light matching the first and second OOK ranging tones to pixel locations on an image plane; and
one or more processor circuits operative to:
receive signals from the one or more light receivers, the signals indicative of the detected reflected emitted light; and
process the signals to determine a location of the object that reflected the emitted light.

18. The location detection system of claim 17 further comprising a display communicatively coupled with the lensed detector array and the one or more processor circuits, the display operative to display an image of the mapped pixel locations.

19. The location detection system of claim 17 wherein the one or more processor circuits are further operative to:
- calculate a propagation delay ($\tau$) for each pairing of the one or more light sources and the one or more light receivers for light that was emitted by the one or more light sources and detected by the one or more light receivers after reflecting off the object;
- calculate a bounce distance (D) for each pairing of the one or more light sources and the one or more light receivers from the one or more light sources to the object to the one or more light receivers;
- construct a ellipse for each pairing of the one or more light sources and the one or more light receivers in which the location of the one or more light sources and the location of the one or more light receivers represent the foci of each ellipse;
- solve for an intersection point (P) of the ellipses using the known foci locations for the ellipses, the propagation delays, and the bounce distances.

20. The location detection system of claim 17 wherein the vehicle comprises one of an automobile and a motorcycle.

\* \* \* \* \*